United States Patent
Buckley

(10) Patent No.: US 12,509,745 B2
(45) Date of Patent: Dec. 30, 2025

(54) PRODUCTION OF IRON

(71) Applicant: Technological Resources Pty. Limited, Melbourne (AU)

(72) Inventor: Michael Buckley, Mosman Park (AU)

(73) Assignee: TECHNOLOGICAL RESOURCES PTY LIMITED, Melbourne (AU)

( * ) Notice: Subject to any disclaimer, the term of this patent is extended or adjusted under 35 U.S.C. 154(b) by 541 days.

(21) Appl. No.: 17/903,790

(22) Filed: Sep. 6, 2022

(65) Prior Publication Data

US 2023/0002853 A1   Jan. 5, 2023

Related U.S. Application Data

(62) Division of application No. 16/343,833, filed as application No. PCT/AU2017/051163 on Oct. 24, 2017, now Pat. No. 11,479,829.

(30) Foreign Application Priority Data

Oct. 24, 2016  (AU) ................................ 2016904312

(51) Int. Cl.
 *C22B 5/10*  (2006.01)
 *C21B 3/00*  (2006.01)
 (Continued)

(52) U.S. Cl.
 CPC ................ *C22B 5/10* (2013.01); *C21B 3/00* (2013.01); *C21B 11/10* (2013.01); *C21B 13/004* (2013.01);
 (Continued)

(58) Field of Classification Search
 CPC .... C22B 5/10; C22B 5/00; C21B 3/00; C21B 11/10; C21B 13/004; C21B 13/0066;
 (Continued)

(56) References Cited

U.S. PATENT DOCUMENTS

| 4,822,410 A | 4/1989 | Matovich |
| 4,906,290 A | 3/1990 | Worner |

(Continued)

FOREIGN PATENT DOCUMENTS

| CN | 102392093 A | 3/2012 |
| CN | 102864265 A | 1/2013 |

(Continued)

OTHER PUBLICATIONS

JP2010222667, Yabe et al., Method of Reducing Iron Oxide-Containing Material, Oct. 7, 2010 (Year: 2010).*

(Continued)

*Primary Examiner* — Jessee R Roe
*Assistant Examiner* — Michael Aboagye
(74) *Attorney, Agent, or Firm* — Banner & Witcoff, Ltd.

(57) ABSTRACT

An apparatus for direct reduction of iron ore in a solid state including a pre-heating furnace for pre-heating iron ore fragments and biomass in briquettes of these materials to a temperature in the range of 400-900° C.; and a reduction assembly for briquettes from the pre-heating furnace. The reduction assembly includes a reaction chamber, a source of electromagnetic energy in the form of microwave energy, a wave guide for transferring microwave energy to the chamber for heating and reducing iron ore in briquettes from the pre-heating furnace, with biomass acting as a reductant, a source of an inert gas, pipework for supplying the inert gas to the chamber to maintain the chamber under anoxic conditions, and an outlet for discharging an offgas and any retained particulates that are generated in the chamber.

5 Claims, 8 Drawing Sheets

SCHEMATIC OF RE-ENTRANT CAVITY PERTURBATION MEASUREMENT SYSTEM
FOR DETERMINATION OF COMPLEX PERMITTIVITY AT HIGH TEMPERATURES

(51) Int. Cl.

| | |
|---|---|
| *C21B 11/00* | (2006.01) |
| *C21B 11/10* | (2006.01) |
| *C21B 13/00* | (2006.01) |
| *C21B 13/12* | (2006.01) |
| *C21B 15/00* | (2006.01) |
| *C22B 5/00* | (2006.01) |
| *F27D 11/12* | (2006.01) |
| *F27D 19/00* | (2006.01) |
| *F27D 99/00* | (2010.01) |
| *H05B 6/80* | (2006.01) |

(52) U.S. Cl.
CPC .......... *C21B 13/0066* (2013.01); *C21B 13/12* (2013.01); *C21B 15/00* (2013.01); *C22B 5/00* (2013.01); *F27D 11/12* (2013.01); *F27D 19/00* (2013.01); *H05B 6/806* (2013.01); *C21B 2200/00* (2013.01); *F27D 2099/0028* (2013.01); *Y02P 10/122* (2015.11)

(58) Field of Classification Search
CPC ..... C21B 13/12; C21B 15/00; C21B 2200/00; C21B 13/002; F27D 11/12; F27D 19/00; F27D 2099/0028; H05B 6/806
USPC ...................... 266/175; 75/10.13, 10.15, 522
See application file for complete search history.

(56) References Cited

U.S. PATENT DOCUMENTS

| | | | |
|---|---|---|---|
| 6,802,886 B2 | 10/2004 | Hoffman et al. | |
| 7,632,330 B2 | 12/2009 | Eisele et al. | |
| 8,906,131 B2 * | 12/2014 | Simmons | C21B 13/0046 75/503 |
| 11,479,829 B2 * | 10/2022 | Buckley | F27D 19/00 |
| 11,959,153 B2 * | 4/2024 | Buckley | C21B 11/10 |
| 2007/0209480 A1 | 9/2007 | Eisele et al. | |
| 2009/0324440 A1 | 12/2009 | Marsh et al. | |
| 2012/0029252 A1 | 2/2012 | Lissianski et al. | |
| 2012/0031232 A1 * | 2/2012 | Huang | F27B 9/36 422/186.21 |
| 2013/0081516 A1 | 4/2013 | Simmons | |
| 2015/0068113 A1 | 3/2015 | Conner et al. | |
| 2017/0219290 A1 * | 8/2017 | Sato | H05B 6/647 |

FOREIGN PATENT DOCUMENTS

| | | | |
|---|---|---|---|
| DE | 2802213 A1 | 7/1979 | |
| JP | S64-52028 A | 2/1989 | |
| JP | 2010-222667 A | 10/2010 | |
| JP | 2010222667 | * 10/2010 | ............. C21B 13/00 |
| JP | 2011184718 A | 9/2011 | |
| WO | 00/47780 A2 | 8/2000 | |
| WO | 2002/046482 A1 | 6/2002 | |

OTHER PUBLICATIONS

Feb. 5, 2018—ISR for PCT/AU2017/051163.
Sep. 25, 2018—IPRP for PCT/AU2017/051163.
Feb. 21, 2020—(EP) Extended European Search Report—App 17863708.8 and PCT/AU2017/051163.
Dec. 5, 2016—Australian International-type search for provisional patent application—App 2016904312.
Sep. 7, 2021—(JP) Office Action—App 2019-542756.
Feb. 14, 2022—(KR) First Office Action—App 10-2019-7014839.

* cited by examiner

DSC-TGA METALLIZATION ENDPOINT BASED ON RESIDUAL MASS OF BLENDED BRIQUETTES

DSC-TGA METALLIZATION ENDPOINT BASED ON RESIDUAL MASS OF BLENDED BRIQUETTES

PREDICTION OF MW METALLIZATION BASED ON TGA OF BLENDED BRIQUETTE
AND EXPERIMENTALLY MEASURED MASS LOSS OF MICROWAVE TREATED SAMPLES

HEMATITE TO IRON PEAK AREA RATIO TRANSFORMATION BASED ON MW ENERGY DOSE

PRODUCTION OF IRON

CROSS-REFERENCE TO RELATED APPLICATIONS

This application is a divisional of U.S. patent application Ser. No. 16/343,833, filed Apr. 22, 2019, now issued as U.S. Pat. No. 11,479,829, which is a U.S. National Stage application under 35 U.S.C. § 371 of International Application PCT/AU2017/051163 (published as WO 2018/076048 A1), filed Oct. 24, 2017, which claims the benefit of priority to Application AU 2016904312, filed Oct. 24, 2016. Benefit of the filing date of each of these prior applications is hereby claimed. Each of these prior applications is hereby incorporated by reference in its entirety.

FIELD OF THE INVENTION

The present invention relates to the reduction of iron ore to produce iron.

BACKGROUND OF THE INVENTION

A direct reduced iron (DRI) process is an alternative iron making route to a blast furnace process. In a DRI process, iron oxide minerals such as hematite, goethite and magnetite are reduced in their solid state at temperatures below the melting point of iron, unlike a blast furnace process where liquid iron is formed.

A DRI process typically takes place between 800° C. and 1050° C. by interaction with reductants, usually $H_2$ and CO. These reducing gases are derived from natural gas or coal, with greater than 80% capacity of global DRI plants using natural gas (e.g. MIDREX and HYL plants). Due to the high gas temperatures and throughputs required, DRI plants require large scale pressurised reactor engineering, typically shaft reactors, fluidised bed reactors or rotary kilns.

Raw material requirements for many existing DRI processes are stringent, with systems typically requiring feeds in the form of pellets, or hard natural lump depending on availability and ore suitability, meaning that significant material dressing is required prior to the reduction process. Large plant footprint, height and complexity result in a high capital outlay and significant operating and maintenance costs, with typical energy consumptions for natural gas based processes of between 10 and 11 GJ per tonne DRI.

The iron and steel industry is one of the largest energy users, consuming around 7% of total world energy. Global demand for steel is expected to increase by 50% by 2050, whilst greenhouse gas emissions must be reduced to meet stringent climate change targets.

In the absence of efficient methods for capture and storage of emitted $CO_2$, it is important for the industry to reduce energy use, increase sustainability, and improve flexibility and scalability of operations.

The above discussion is not to be taken as an admission of the common general knowledge in Australia or elsewhere.

SUMMARY OF THE INVENTION

The present invention is a process for direct reduction of iron ore in a solid state under anoxic conditions with biomass as a reductant and with electromagnetic energy as a source of energy.

The present invention is based on a realisation that the use of biomass as a reductant and the use of electromagnetic energy as a source of energy provide an opportunity for effective and efficient production of metallic iron.

The benefits of the process of the invention are based on the ability of electromagnetic energy to volumetrically heat materials. For example, iron oxides such as hematite and goethite, and biomass strongly absorb electromagnetic energy in the form of microwave energy above about 400-600° C. The applicant has realised that heat can be generated directly in the ore and in the biomass as a consequence of the absorption of energy to make it possible to reduce iron ore to high levels of metallisation. The applicant has realised that this opportunity applies particularly when the ore and the biomass are in close contact, for example when in a blend or agglomerated together in the form of briquettes. With the invention, heat transfer limitations of conventional processing can be minimised, resulting in significantly increased heating rates. Significantly reduced heating times result in faster reaction times and make it possible to have a substantial reduction in furnace size compared to furnace sizes for conventional DRI processes such as Midrex (can be greater than 130 m tall), and allow horizontal furnaces to be built, whilst removing the necessity for heating large gas volumes. The ability to directly generate heat within the ore and biomass as a consequence of absorption of electromagnetic energy to an extent that allows reduction of iron ore to high levels of metallisation means that it is not necessary to generate heat from combustion of natural gas. This provides an opportunity to remove the need for pelletizing to the extent required for DRI processes, and increase process control. These factors together provide an opportunity for a reduction in CAPEX whilst improving operability and maintainability.

In addition to the above, and potentially the most significant benefit of the invention, is that the replacement of natural gas and coal with biomass as reductant also provides an opportunity to reduce net $CO_2$ emissions for steelmaking operations, as well as cut reliance on fossil fuels.

The process may include exposing iron ore and biomass to electromagnetic energy with iron ore and biomass in contact under anoxic conditions and electromagnetic energy generating heat within the iron ore and with the biomass acting as a reductant and reducing iron ore in a solid state.

The process may include electromagnetic energy generating heat within the iron ore and within the biomass.

The process may include controlling the operating conditions so that iron ore is heated to a temperature in a range at which there is metallisation of iron ore.

In the case of hematite, the process may include controlling the operating conditions so that iron ore is heated to a temperature in a range of 800-1200° C. for metallisation of the hematite.

The iron ore may be heated to a temperature of at least 800° C., typically at least 900° C.

The iron ore may be heated to a temperature of less than 1200° C., typically less than 1100° C.

Preferably the iron ore is heated to a temperature in a range of 850-950° C.

The process may include controlling the operating conditions so that iron ore is reduced to a required degree of metallisation and forms a solid state metallic iron product.

The required degree of metallisation will depend on a range of factors, such as the end-use application(s) of the iron product.

Typically, 100% metallisation will be targeted. However, the invention is not confined to operating the process to achieve 100% metallisation.

For example, the process may include controlling the operating conditions so that there is at least 80%, typically at least 90%, metallisation of iron ore.

The process may be a continuous process that includes transporting iron ore and biomass through a heating/reduction chamber that has an anoxic environment and exposing iron ore and biomass to electromagnetic energy as iron ore and biomass move through the chamber.

The residence time in the chamber may be one process control option.

The process may include generating the anoxic environment by supplying an inert gas to the chamber.

The inert gas may be any suitable inert gas, such as nitrogen.

The process may include preheating the iron ore and biomass.

The process may include preheating the iron ore and biomass to a temperature less than 900° C., typically less than 800° C.

The process may include preheating the iron ore and biomass to a temperature of at least 400° C., typically at least 500° C.

The process may include preheating the iron ore and biomass to a temperature in a range of 400-900° C.

The process may include transporting iron ore and biomass through a pre-heating chamber and preheating the iron ore and biomass as iron ore and biomass move through the chamber to a heating/reduction chamber; transporting iron ore and biomass through the heating/reduction chamber that has an anoxic environment and exposing iron ore and biomass to electromagnetic energy as iron ore and biomass move through the chamber.

The process may be a batch process.

The process may include any suitable options for bringing iron ore and biomass into close contact. These options include, for example, forming a blend of iron ore and biomass or agglomerating together iron ore and biomass.

The process may include exposing a blend of iron ore fragments and biomass to electromagnetic energy under anoxic conditions and generating heat within the iron ore fragments that causes reduction of iron ore in a solid state in the fragments, with the biomass providing a source of reductant.

The process may include exposing briquettes of iron ore fragments, typically in the form of fines, and biomass to electromagnetic energy under anoxic conditions and generating heat within the briquettes that causes reduction of iron ore in a solid state in the briquettes, with the biomass providing a source of reductant.

The briquettes of iron ore fragments and biomass are a convenient option for providing iron ore and biomass in contact.

The term "briquette" is used herein as a general term to describe agglomerates of multiple iron ore fragments. The term is intended to cover agglomerates that may be described as pellets. The term is not confined to any particular method of producing the agglomerates.

The term "fragment" is understood herein to mean any suitable size piece of iron ore. The term "fragment" as used herein may be understood by some persons skilled in the art to be better described as "particles" or "fines".

The intention is to use terms as synonyms.

The briquettes may be any suitable size and shape.

By way of example, the briquettes may have a major dimension of 1-10 cm, typically 2-10 cm, more typically 2-6 cm and more typically 2-4 cm.

By way of example, the briquettes may be generally cuboid, i.e. box-shaped with six sides and all angles between sides being right angles.

The briquettes may include any suitable relative amounts of iron ore and biomass.

The briquettes may include 20-45% by mass, typically 30-45% by mass, biomass.

In any given situation, the preferred proportions of the iron ore and biomass will depend on a range of factors, including but not limited to the type (e.g. hematite, goethite or magnetite) and characteristics (such as fragment size and mineralogy) of the iron, the type and characteristics of the biomass, the operating process constraints, and materials handling considerations.

The briquettes may include other components.

One possible additional component is a binder to facilitate holding the briquette together, for example so that the briquette has required structural properties for materials handling requirements for the process.

The iron ore may be run-of-mine material that has been subjected to crushing and size separation after the material has been mined.

By way of example, the iron ore may be in the form of fines.

The term "fines" is understood herein to mean fragments less than 8 mm.

The term "anoxic" is understood herein to mean greatly deficient or totally depleted in oxygen.

The term "biomass" is understood herein to mean living or recently living organic matter. Specific biomass products include, by way of example, forestry products (including mill residues), agricultural products, biomass produced in aquatic environments such as algae, agricultural residues such as straw, olive pits and nut shells, animal wastes, municipal and industrial residues.

The biomass may be any suitable biomass in any suitable form.

One particular biomass of interest to the applicant is aquatic fern families including the *Azolla* genus comprising *Azolla pinnata*, with common names of Red *Azolla* and Ferny *Azolla*. *Azolla* is a small, native, floating fern—one of only six, free-floating, aquatic fern species. It grows from 1cm to 2.5 cm wide and is a bright green colour. Its colour changes to deep red when it is exposed to the sun, thus the name Red *Azolla*. *Azolla* grows in waterways in dense patches, which can look like a green or red carpet. From a distance it may be confused with *Salvinia*, a noxious aquatic weed, or the scum of a blue green algal bloom. *Azolla* is a low cost aquatic freshwater fern that can produce high dry biomass rates, up to double that of other biofuel crops such as *Miscanthus*. It requires far less nitrogen fertilization than conventional crops and aquaculture systems can be constructed on marginal land, not in use for agriculture. *Azolla* also improves water quality, whilst simultaneously mitigating pollution through bioaccumulation of heavy metals.

Other biomass of interest include but are not limited to energy crops such as varieties of sorghum, switchgrass and *Miscanthus giganteus* as well as sugar cane bagasse. Sawdust is a biomass of interest. The biomass can be used as the sole source of reductant or can be blended.

The invention is not confined to any particular type of electromagnetic energy.

The current focus of the applicant is on the microwave energy band of the electromagnetic energy spectrum.

However, radio frequency energy and x-ray energy are two other options amongst the range of options in the electromagnetic energy spectrum that are of interest to the applicant.

The electromagnetic energy may be continuous or pulsed.

The microwave energy may have any suitable microwave frequency, such as a frequency in the range of 300 MHz-300 GHz, 300 MHz-30 GHz, 300 MHz-3 GHz, 400-5800 MHz, 900-3500 MHz, 915-2450 MHz. Particular microwave frequencies are the current industrial frequencies of 2450 MHz or 915 MHz.

The radio frequency energy may have any suitable frequency, such as a frequency in the range of 1 MHz-10 GHz.

The iron ore may be any suitable type, such as hematite, goethite and magnetite.

The process may include downstream processing of the solid state metallic product to form end-use products, such as steel products.

The present invention also provides an apparatus for direct reduction of iron ore that includes an exposure chamber for exposing iron ore and biomass to electromagnetic energy under anoxic conditions.

The iron ore and biomass may be in the form of briquettes, pellets, or other suitable product shapes that comprise a blend of the iron ore and biomass.

The apparatus may include a pre-heating furnace for pre-heating the iron ore and biomass. Typically the furnace is adapted to heat the iron ore and biomass to a temperature in the range of 400-900° C. for a pre-determined time and a pre-determined time.

The apparatus may include a reduction assembly for treating the iron ore fines and biomass and, in particular, heating and reducing the iron ore fines to form a metallised product.

The assembly may include a reaction chamber in which the iron ore fines are heated and reduced, a source of electromagnetic energy in the form of microwave energy (or any other suitable electromagnetic energy), a wave guide for transferring microwave energy to the chamber, a source of an inert gas, such as nitrogen, suitable pipework for supplying the inert gas to the chamber to maintain the chamber under anoxic conditions during the treatment of the iron ore fines and biomass in the chamber, and an outlet for discharging an offgas and any retained particulates that are generated during the treatment in the chamber.

The offgas from the heating/reduction chamber may contain chemical and thermal energy. The chemical energy may be predominantly in the form of carbon monoxide. The offgas energy may be beneficially:

(a) combusted in a power plant to provide electricity;
(b) separated from the remainder of the offgas and recycled through the heating/reduction chamber to improve process efficiency and reduce the biomass requirement; or
(c) provided to a facility that can convert the energy into a biofuel such as ethanol (e.g. the LanzaTech™ process).

If carbon dioxide is separated from the heating/reduction chamber offgas, it can be permanently geologically stored (also known as carbon capture and storage) which could result in net negative carbon emissions for the process.

BRIEF DESCRIPTION OF THE DRAWINGS

The invention is described further by way of example only with reference to:

(a) FIGS. 1 to 13 that relate to a feasibility study in relation to the invention that is described below and
(b) FIG. 14 which is a block diagram of an embodiment of the invention, of which:

Figure 1:
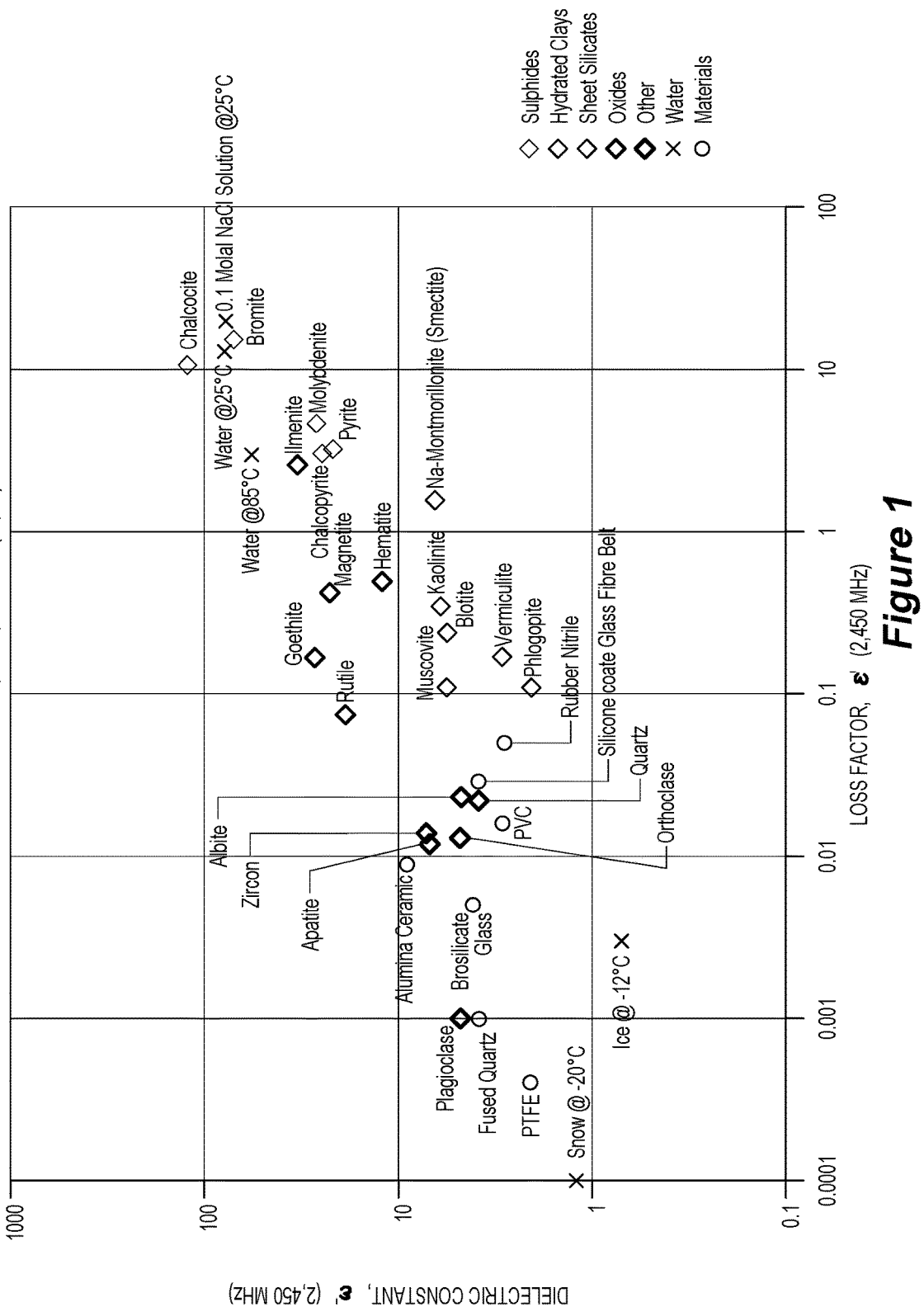
Figure 2:
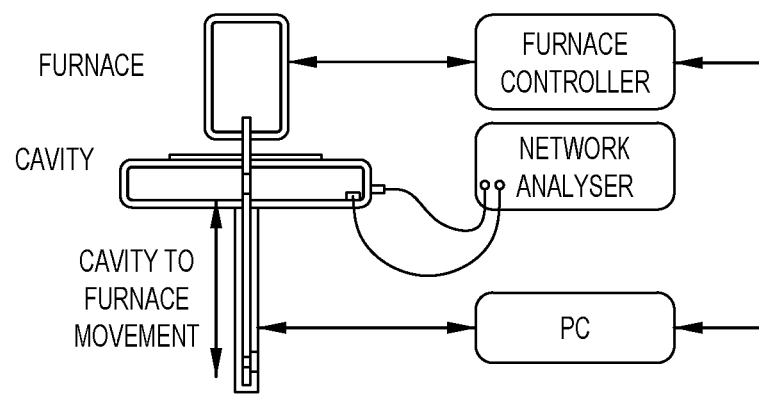
Figure 3:
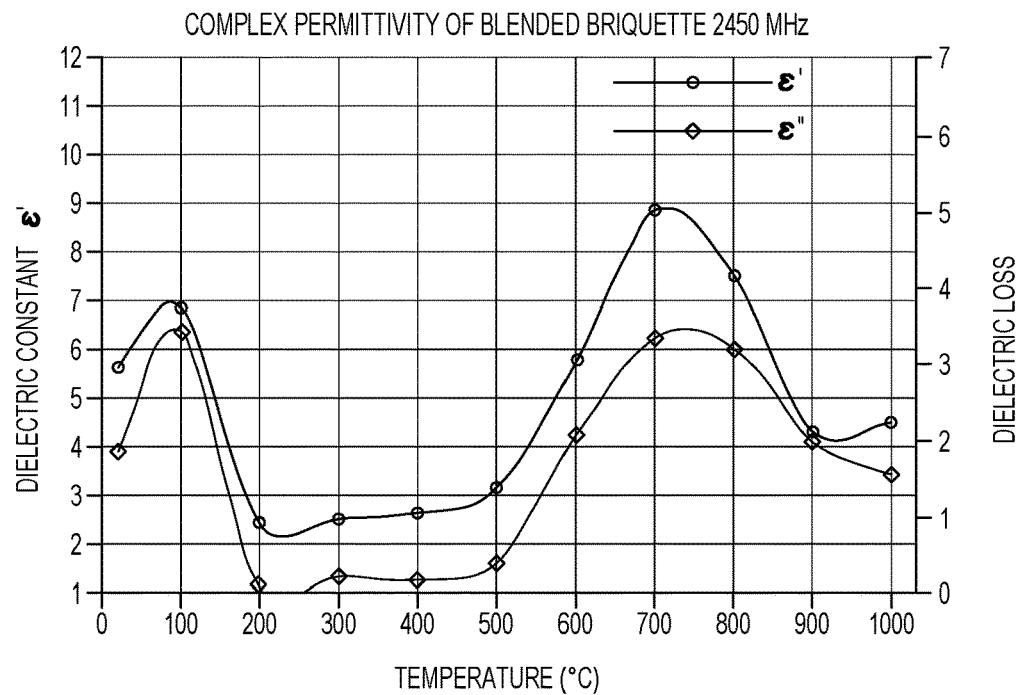
Figure 4:
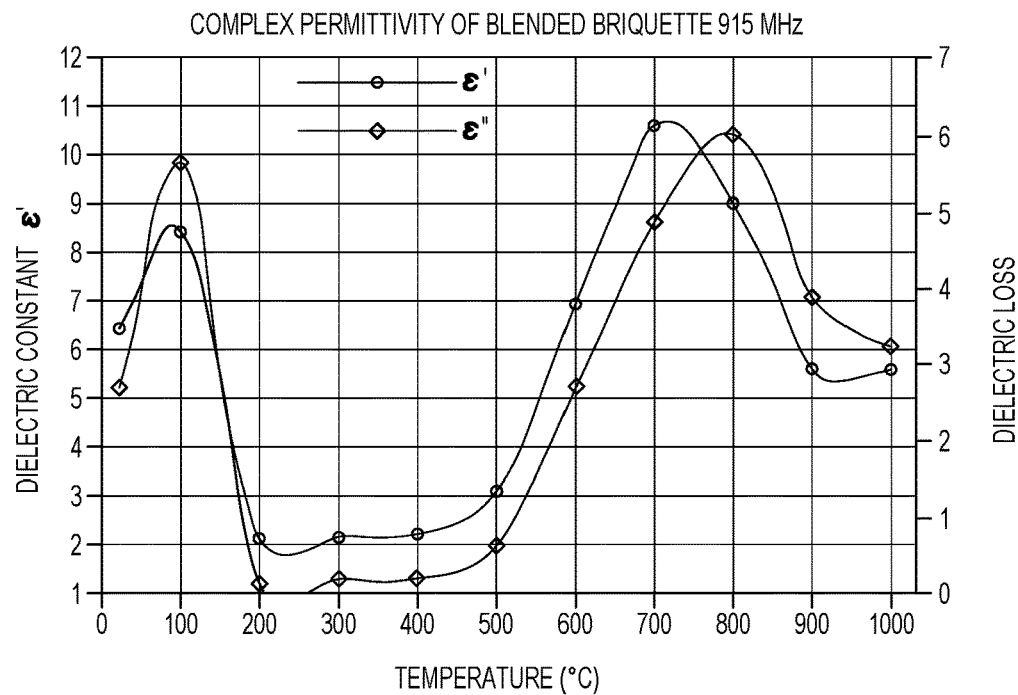
Figure 5:
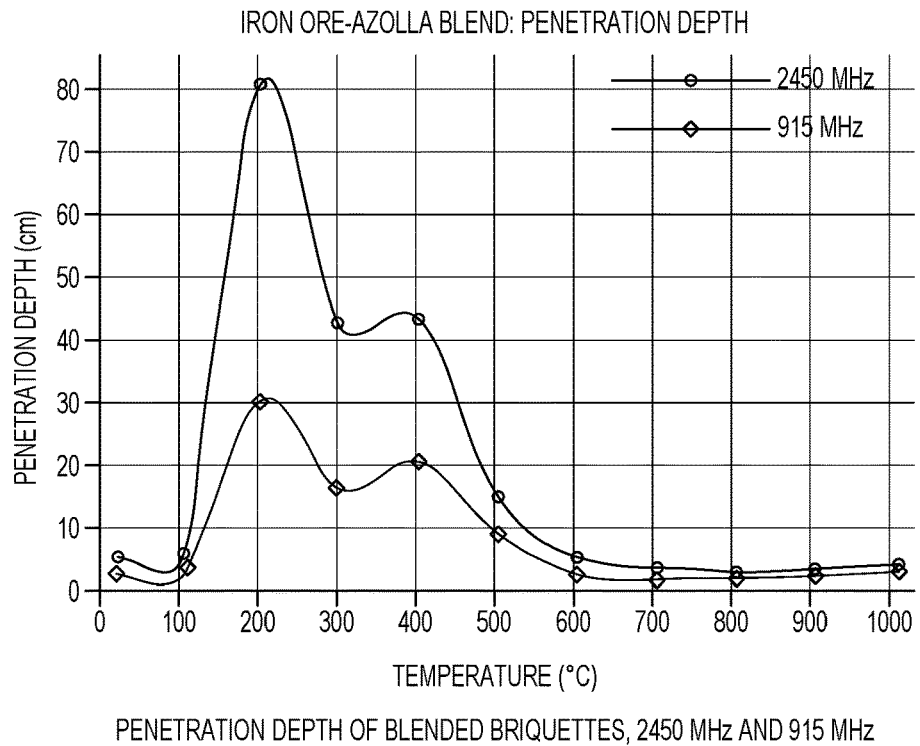
Figure 6:
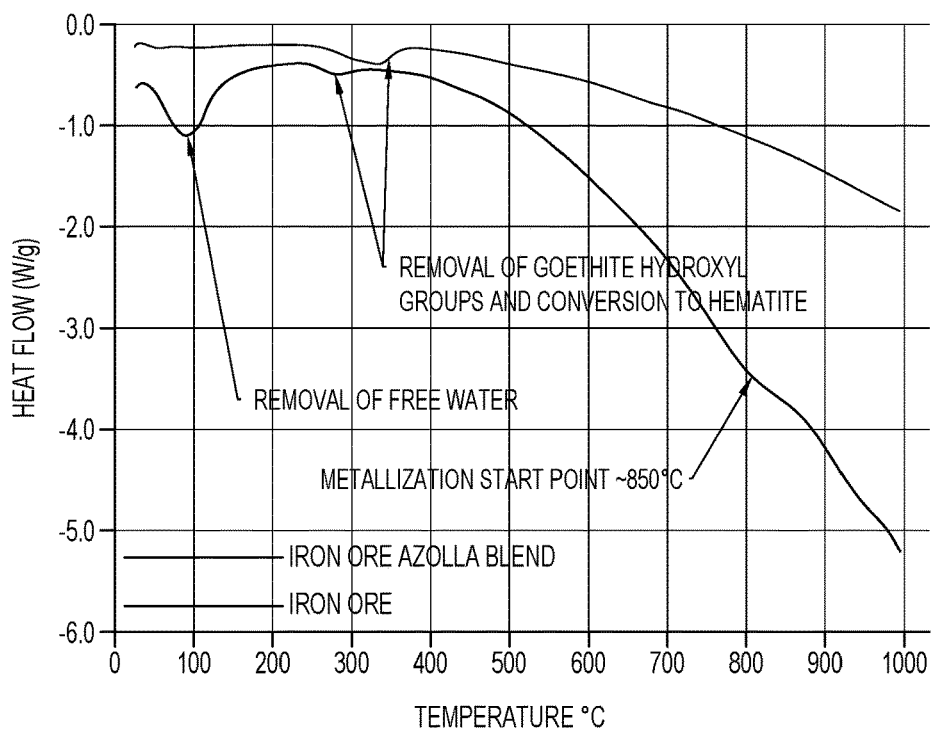
Figure 7:
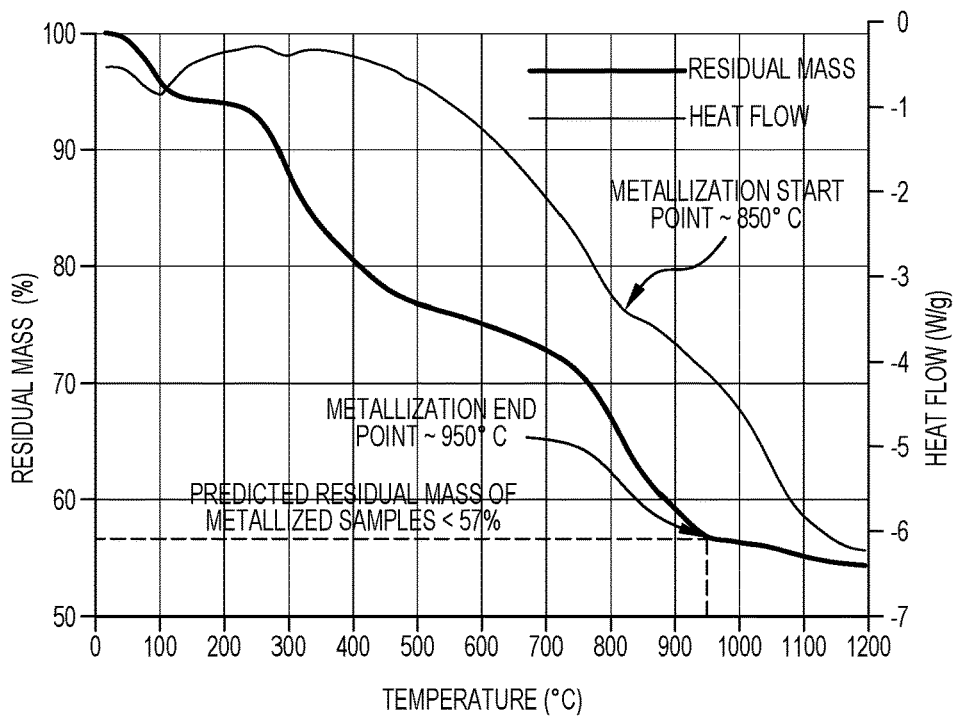
Figure 8:
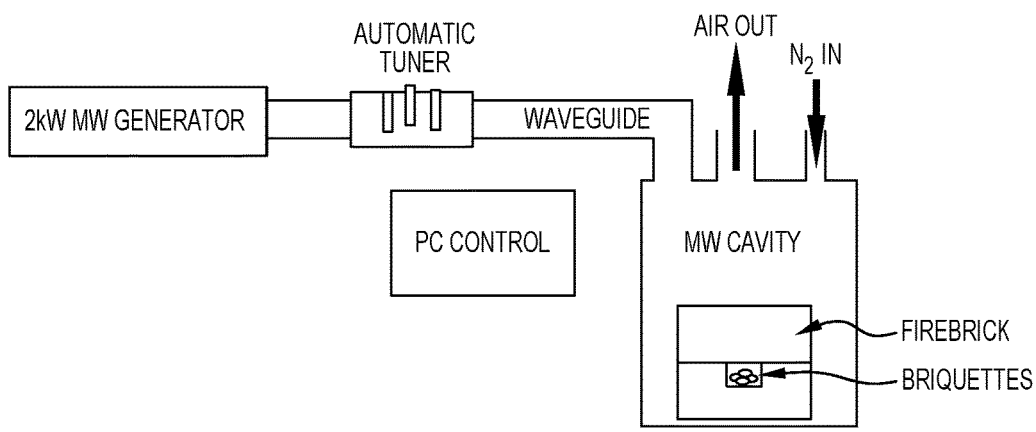
Figure 9:
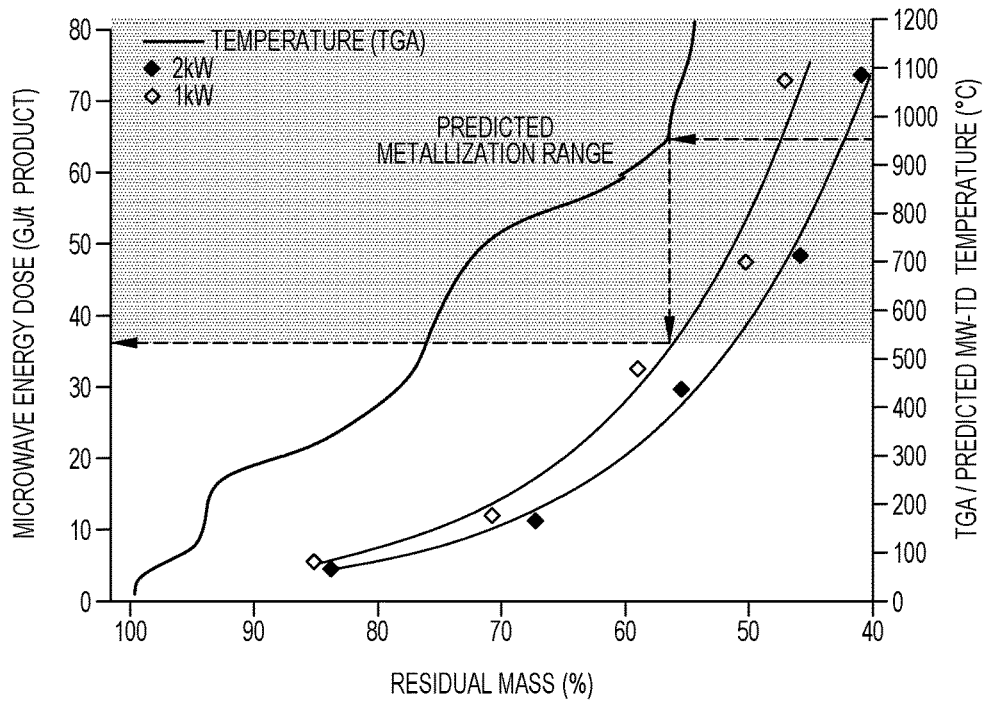
Figure 10:
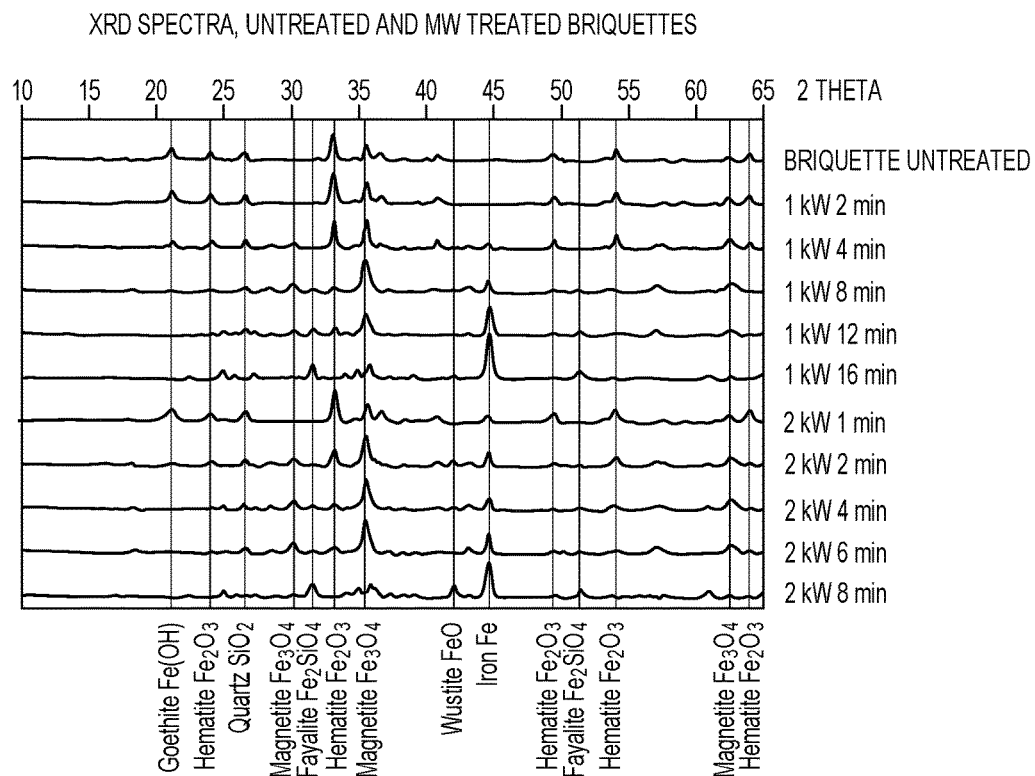
Figure 11:
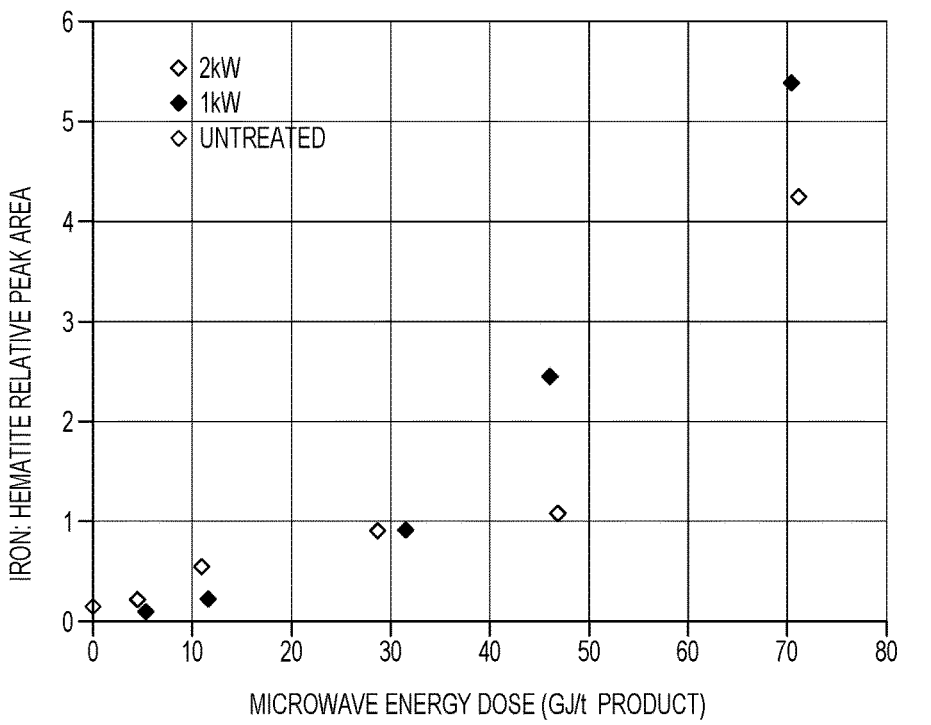
Figure 12:
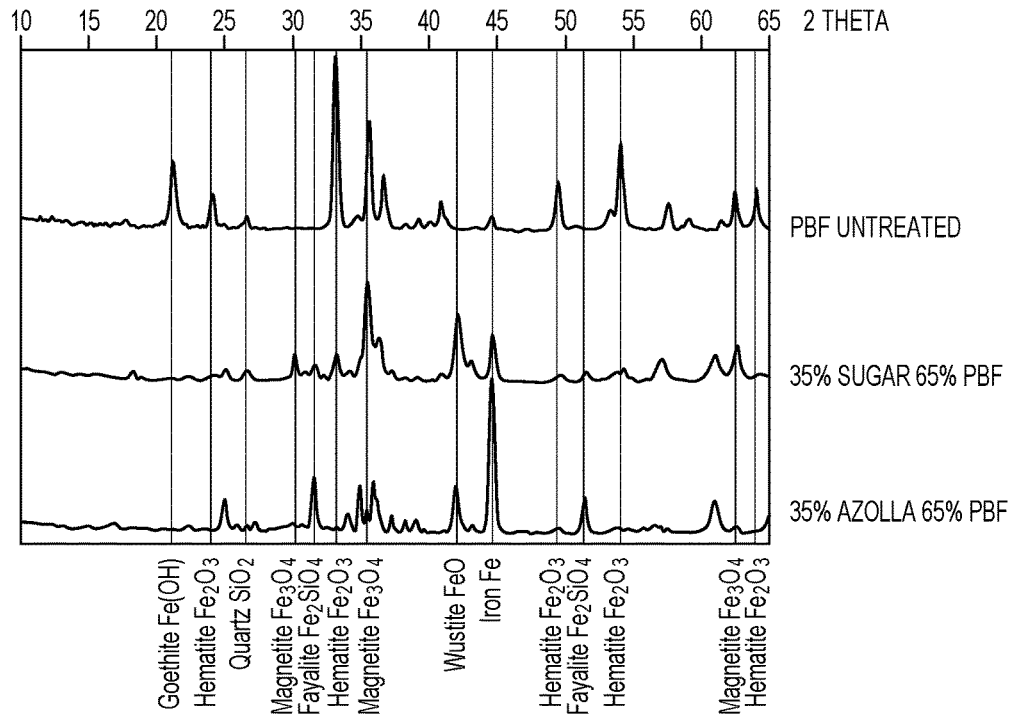
Figure 13:
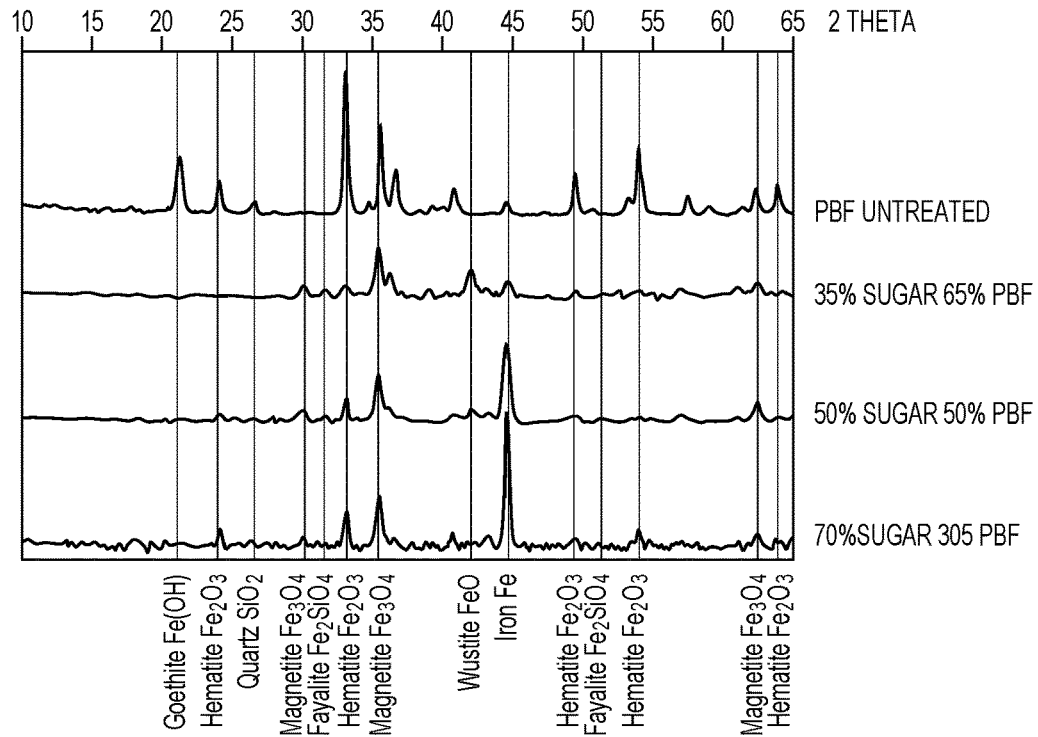
Figure 14:
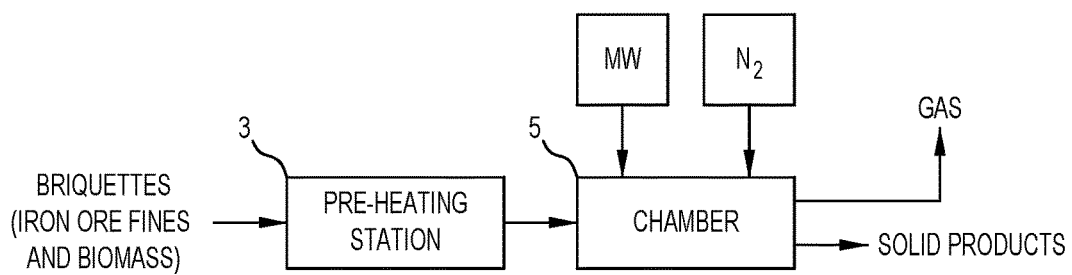

More Particularly:

FIG. 1 is a graph of the dielectric properties of a range of engineering materials and minerals at a frequency of 2450 MHz at 20° C., together with water at different temperatures;

FIG. 2 is a diagram that illustrates a resonant cavity perturbation method used to measure the dielectric properties of materials from 20-1000° C. in the feasibility study;

FIGS. 3 and 4 are graphs for blended briquettes of PBF/biomass at 2450 MHz and 915 MHz, between 20-1000° C. tested in the feasibility study;

FIG. 5 is a plot of penetration depths of blended PBF/biomass briquettes as a function of measurement temperature tested in the feasibility study;

FIG. 6 is a plot of the DSC temperature-heat flow curves for iron ore and blended briquettes of PBF/biomass, in nitrogen, between 20-1000° C. tested in the feasibility study;

FIG. 7 is a plot of the DSC heat flow curve for blended PBF/biomass briquettes alongside a corresponding TGA curve, showing the change in mass with temperature between 20-1200° C., tested in the feasibility study;

FIG. 8 is a schematic of a full microwave treatment system used in the feasibility study;

FIG. 9 is a plot of the mass-temperature curve of blended briquettes of PBF/biomass as determined using TGA under nitrogen between 20-1200° C., tested in the feasibility study;

FIG. 10 is plots of the XRD spectra for ten microwave treatments;

FIG. 11 is a graph of the ratio of XRD peaks as a function of microwave energy input tested in the feasibility study;

FIG. 12 shows the XRD spectra for a PBF/sugar blend compared to a PBF/*Azolla* blend and unprocessed ore fines tested in the feasibility study;

FIG. 13 shows the XRD spectra for three sugar treatments compared to unprocessed ore fines tested in the feasibility study; and FIG. 14 is a diagram of one embodiment of a process and an apparatus for direct reduction of iron ore in a solid state in accordance with the invention.

DETAILED DESCRIPTION OF THE EMBODIMENTS

In broad terms, the process of the invention includes exposing iron ore and biomass to electromagnetic energy with iron ore and biomass in contact under anoxic conditions, with the electromagnetic energy generating heat within the iron ore, and with the biomass acting as a reductant and reducing iron ore in a solid state.

Feasibility Study

The above-mentioned feasibility study was undertaken to determine the technical feasibility of achieving metallization of iron ore (in the form of the Pilbara Blend Iron Ore Fines (PBF) product of a related company of the applicant) blended with *Azolla* biomass using microwave energy as the heating source for the iron ore and the biomass.

The dielectric and thermal properties of iron ore, biomass and blended briquettes of iron ore/biomass were characterised and evaluated.

The objectives of the study were as follows:

Measurement of dielectric properties of PBF, biomass and blended briquettes of PBF/biomass to quantify the relationship between temperature (20-1000° C.) and complex permittivity (microwave absorbing properties) at the industrially utilised frequencies of 2450 MHz and 915 MHz.

Differential scanning calorimetry of the PBF and blended briquettes between 20-1000° C. to identify key material transitions in the reduction process under nitrogen, determine the relationship between temperature and metallization and identify the expected temperature required to metallize blended briquettes using microwave energy.

Thermogravimetric analysis of the PBF and blended briquettes between 20-1000° C. under nitrogen to determine the relationship between temperature and mass loss during the reduction process, and identify the expected residual mass of blended briquettes metallized using microwave energy.

Microwave heating trials of blended briquettes under anoxic conditions at 2.45 GHz to determine the influence of microwave power density (1 or 2 kW applied power), total applied energy (up to 75 GJ/t product) and treatment time (between 1 and 16 minutes) on metallization.

Semi-quantitative XRD characterisation of PBF, blended briquettes and all microwave treated samples to identify all iron containing phases and determine the relationship between microwave treatment conditions and the degree of metallization achieved.

Microwave treatment of PBF blended with 35%, 50% and 65% sucrose (by mass) to determine the influence of biomass type and biomass content on the degree of metallization.

Measurement of external temperatures of a firebrick treatment enclosure following treatment at highest energies and estimation of the heat loss from the sample to the enclosure, to determine the microwave treatment energy balance and potential efficiencies for an optimised industrial process where heat losses are minimised.

1. Materials Characterisation (Work Program 1)

This section presents the theory, methodology and results of characterisation of the PBF, *Azolla* biomass and blended briquettes of PBF/biomass, which were performed to understand their fundamental interactions with microwave energy prior to commencing the test matrix in Work Program 2.

1.1 Dielectric Characterisation 1.1.1 Dielectric Theory

The ability of materials to absorb and subsequently heat due to an applied electromagnetic field is dependent on the electrical and magnetic properties of the material, specifically the permittivity ($\varepsilon$), permeability ($\mu$), and conductivity ($\sigma_e$). For most materials, the dominant interaction is with electric field; dielectric properties are a measure of this interaction. The dielectric properties of a homogenous material are described by the complex relative permittivity as shown in Equation 1:

$$\varepsilon^* = \varepsilon' - j\varepsilon'' \quad \text{Equation 1}$$

Where $\varepsilon^*$=complex relative permittivity; $\varepsilon'$=dielectric constant; $\varepsilon''$=dielectric loss factor; $j=\sqrt{-1}$.

The dielectric constant (real part of the permittivity), $\varepsilon'$, measures the ability a material to be polarised by an external electric field; i.e. the ability of charges and dipoles to be polarised. The dielectric loss factor (imaginary part of the permittivity), $\varepsilon''$, measures the ability of a material to dissipate the stored energy as heat. Dielectric properties of materials can vary according to composition, water content, temperature, frequency and density. FIG. 1 plots the dielectric properties at 2450 MHz, for a range of engineering materials and minerals at 20° C., together with water at different temperatures.

1.1.2 Complex Permittivity Measurement

Dielectric property measurements were performed on both the PBF and *Azolla* biomass components and also the blended briquettes. Their relationship with temperature up to 1000° C. was quantified. This knowledge provides mechanistic understanding of the process and also crucially informs both the test methodology for WP2 and discussions around the potential for full scale system development. These measurements were performed at the industrially utilised microwave frequencies of 2450 and 915 MHz.

A resonant cavity perturbation method (see FIG. 2) was used to measure the dielectric properties of the materials from 20-1000° C. The resonant cavity consists of a cylindrical copper cavity connected to a vector network analyser, which measures the frequency shift and change in quality factor relative to the empty resonating cavity when a sample is introduced. Finely milled samples (<100 μm) were loaded into a quartz tube, (ceramic wool below the sample and open at the top to minimise air ingress) and held in a conventionally heated furnace above the cavity until the temperature set-point was reached. The tube was then moved into the cavity, and the properties determined at the industrially utilised microwave frequencies of 2450 MHz and 915 MHz. It should be noted that as it was not possible to safely conduct the dielectric characterisation in anoxic conditions (i.e. under nitrogen) as the cavity and furnace were both open to the laboratory.

The results of the dielectric property measurement of the PBF, *Azolla* biomass and the blended briquettes of PBF/biomass at 2450 MHz and 915 MHz, between 20-1000° C., were plotted. FIGS. 3 and 4 are the graphs for blended briquettes of PBF/biomass at 2450 MHz and 915 MHz, between 20-1000° C. In each graph, the temperature is plotted on the horizontal axis, the dielectric constant on the left vertical axis (blue line) and the dielectric loss on the right vertical axis (red line). Measurements at 2450 MHz relate to the frequency commonly used for laboratory scale testing, whilst measurements at 915 MHz relate to the frequency currently utilised for most industrial processing systems at power levels over 50 kW.

The PBF was found to have relatively consistent dielectric properties between 20-600° C. Slight inflections at around 100° C. and 300-400° C. were due to the removal of free water and goethite hydroxyl groups respectively. Above 600° C., PBF exhibited an increase in dielectric properties, attributed to temperature dependent iron oxide phase changes.

The *Azolla* biomass was found to strongly absorb microwave energy below approximately 150° C. and above 500° C. The reduction in dielectric properties between 100-200° C. was due to the removal of free water. The increase above 500° C. was due to the pyrolysis of the biomass, releasing volatiles to leave carbonaceous char and ash (due to the imperfect seal on the tube it is unlikely that fully anoxic conditions would have been achieved).

Not surprisingly given the above results for PBF and biomass separately, the measurement results for the blended briquettes of PBF/biomass exhibited characteristics of both the iron ore and biomass. Inflections between 100-200° C. and between 300-400° C. were due to removal of free water from both the iron ore and the biomass, and removal from goethite hydroxyl groups. The increase between 500-700° C. was due to combustion of the biomass, as again the open tube did not permit a fully reducing atmosphere. The decrease above 700° C. was due to progressive reduction of the iron oxides.

Overall, both the PBF and the *Azolla* biomass, and the blended briquettes of PBF/biomass strongly absorbed microwave energy across the full temperature range measured, at both 2450 MHz and 915 MHz, particularly below 200° C. and above 700° C.

1.1.3 Penetration Depth

When an electromagnetic energy wave propagates in a dielectric material, its amplitude diminishes due to power absorption in the material. The field intensity and power falls exponentially with depth from the materials surface. Dp, the penetration depth of electromagnetic energy into a material, is defined as the depth at which the power flux falls to 1/e (0.368) of its surface value, The penetration depth in a material is a good indicator of the potential to achieve heating uniformity within a material. Penetration depth is proportional to wavelength; at higher frequencies surface heating is more likely, whilst at low frequencies volumetric heating is more readily attained. Penetration depth is important when volumetric heating of a material is required. It should be noted that some heating occurs beyond the defined penetration depth, as the electric field has not reached zero until some point after the penetration depth.

Selection of the appropriate frequency is important to ensure that the dimensions of the material are not much larger than penetration depth; thus it is a key design parameter when considering process design and scale up. The penetration depths of blended PBF/biomass briquettes were calculated and are plotted in FIG. 5 as a function of measurement temperature. The blended briquettes exhibited an increase in penetration depth between 100 and 200° C., due to the removal of free water. The penetration depth then decreased around 300° C., with a slight inflection around 350° C. due to the removal of hydroxyl groups. Above 500° C., the penetration depth remained relatively constant. The penetration depth was high at 915 MHz compared to 2450 MHz (approximately 5 cm and 2 cm respectively, above 500° C.). Overall, the penetration depth was similar in scale to the dimensions of the blended briquettes. This suggests that from a microwave heating perspective, it would be possible to achieve volumetric heating of a continuous load of 5-10 cm thick at 915 MHz.

1.2 Thermal Characterisation

Thermogravimetric analysis (TGA) and differential scanning calorimetry (DSC) were performed on both the PBF and blended briquettes of PBF/biomass in anoxic conditions (under nitrogen) and their relationship with temperature up to 1000° C. was quantified.

DSC allows mapping of thermal behavior and identification of 'thermal events' during the heating process.

TGA provides a mechanistic understanding of how the briquette mass should change during the microwave treatment process. Combining the thermal behavior data enables the prediction of a 'metallization range' based on mass loss of microwave treated samples, as measured following treatment.

FIG. 6 plots the DSC temperature-heat flow curves for both the iron ore and blended briquettes of PBF/biomass, in nitrogen, between 20-1000° C. From these curves, three thermal events can be identified that occur during the direct reduction of iron ore in the presence of biomass under DSC conditions. The first is the removal of free water just above 100° C. from the biomass fraction of the briquettes. The second thermal event is the removal of goethite hydroxyl groups and conversion to hematite; this peak is shifted slightly in the briquette sample. This is possibly due to pyrolysis products from the biomass allowing the conversion of goethite to hematite to occur at a lower temperature. The final thermal event identified is the onset of metallization at around 850° C. in the briquette sample.

In FIG. 7, the DSC heat flow curve for blended PBF/biomass briquettes is plotted alongside the corresponding TGA curve, showing the change in mass with temperature between 20-1200° C. (the temperature measurement range for the briquette was extended from 1000° C. to identify the metallization endpoint). The data suggests a metallization start point around 850° C. and an endpoint at approximately 950° C., under DSC conditions.

At the metallization endpoint, the weight change with temperature of the briquette starts to plateau. The residual mass of the DSC-TGA sample at this temperature was 57%. This suggests that if microwave treatment conditions are the same as those for characterisation, treated samples weighing less than 57% of their original mass should be metallized, with little or no iron oxides present.

1.3 Work Package 1 Summary

The dielectric properties of the PBF, biomass and blended briquettes of PBF/biomass were measured using the cavity perturbation method, between 20-1000° C. at the industrially utilised frequencies of 2450 MHz and 915 MHz. The results indicate that all the materials exhibit strong microwave absorbing properties across the full range measured. Above 500° C., the penetration depths are relatively constant (~2 cm at 2450 MHz and ~5 cm at 915 MHz). This indicates that at 915 MHz it would be possible to achieve volumetric heating of a continuous load 5-10 cm thick, although some heating occurs beyond the defined penetration depth. These results show that the materials should all strongly absorb microwave energy throughout all metallization experiments proposed in Work Package 2.

Differential scanning calorimetry of the PBF and blended briquettes of PBF/biomass between 20-1000° C. was used to identify key material transitions in the reduction process under nitrogen, determine the relationship between temperature and metallization and identify the expected temperature required to metallize blended briquettes using microwave energy. The key region for metallization of the briquettes was identified to be between 850-950° C.

Thermogravimetric analysis of the PBF and blended briquettes between 20-1000° C. under nitrogen was conducted to determine the relationship between temperature and mass loss during the reduction process, and identify the expected residual mass of blended briquettes metallized using microwave energy. The suggested mass of a metallized sample at 950° C. was ~57% of its mass prior to reduction. This suggests that if DSC-TGA and microwave treatments provide equivalent reductive atmospheres, samples treated in Work Program 2 with a mass of ~57% should exhibit metallization.

2. Microwave Proof of Concept Testing (Work Program 2)

This section presents the experimental methodology and results of microwave heating experiments to determine the technical feasibility of achieving full metallization through heating the PBF/*Azolla* blended briquettes using microwave energy in an anoxic atmosphere.

The tests carried out quantify the relationship between energy input, power density, treatment time and the degree of metallization of the product. The outcome of each different microwave treatment was evaluated through semi-quantitative X-ray diffraction (XRD) to determine the degree of metallization that had been achieved relative to the untreated briquettes.

2.1 Experimental Methodology and Treatment System

A range of laboratory and bespoke microwave systems was available for proof of concept microwave treatments. The dielectric property measurements carried out in Work Program 1 showed that the iron ore/biomass blend has strong microwave absorbing properties.

A laboratory scale multimode system (regions of high and low electric field across the cavity) was selected, with dimensions of 540×425×425 mm. Microwave treatments were carried out at the allocated frequency of 2450 MHz which is best suited to small scale laboratory testing.

For each treatment carried out, an approximately 27 g (~4 briquettes) sample of material was weighed out and placed into a mullite firebrick enclosure inside the multimode cavity. This material is essentially transparent to microwave energy compared to the briquettes and it was therefore been assumed that all applied energy was absorbed by the sample although in reality there would have been energy dissipation into this phase both through weak microwave heating and heat transfer from the briquettes. This enclosure was used to reduce heat losses from the sample surface during processing.

The system was inverted with nitrogen at a flowrate of 25 litres per minute prior to and during microwave treatment to provide anoxic conditions.

The sample was then treated at the selected power and treatment time.

Air extraction was used during microwave processing to remove any gases and particulates generated during pyrolysis of biomass fraction of the briquettes.

During treatment, the energy absorbed by the load was monitored and controlled using an automatic tuner and PC.

A schematic of the full microwave treatment system is shown in FIG. 8.

For the highest microwave doses, the temperatures on the outside of the firebrick were measured immediately after microwave treatment using an infra-red gun, to allow the heat dissipation into the firebricks and thus energy balance to be estimated.

Once the material had cooled, it was recovered from the firebrick enclosure and re-weighed to determine the mass lost during treatment, then milled to a fine powder for XRD characterisation.

2.2 Microwave Treatment Results

To determine the influence of energy input and power density/treatment time on the degree of metallization, a matrix of 11 treatments was completed, as shown in Table 1 below.

TABLE 1

Feasibility study test matrix

| Applied power (kW) | Treatment time (min) | Actual dose (kWh/t briquettes) | Gross energy GJ/t product |
|---|---|---|---|
| 2 | 1 | 1081 | 5 |
| 2 | 2 | 2132 | 11 |
| 2 | 4 | 4568 | 30 |
| 2 | 6 | 6164 | 48 |
| 2 | 8 | 8373 | 74 |
| 2 | 10 | 11296 | * |
| 1 | 2 | 1319 | 6 |
| 1 | 4 | 2365 | 12 |
| 1 | 8 | 5345 | 33 |
| 1 | 12 | 6643 | 48 |
| 1 | 16 | 9531 | 73 |

* This sample was molten and penetrated the mullite firebrick enclosure, with repeat treatments yielding the same result. It was therefore not possible to recover a clean sample for comparative XRD analysis and energy balance estimation with other treatments.

Applied power was set at either 1 kW or 2 kW, and treatment times of between 1 and 16 minutes were used. An automatic tuner was used to minimise reflected power and ensure >95% of applied energy was absorbed. These treatments gave resulting microwave energy inputs of between 1000-11300 kWh/t of briquettes, equivalent to between 5 and 74 GJ/t of product (based on the mass treated material recovered).

A visual inspection of the untreated and microwave treated briquette samples after milling showed a clear progressive colour change with increasing energy input, due to the level of reduction of iron minerals from red hematite through to grey metallic iron.

FIG. 9 plots the mass-temperature curve of blended PBF/biomass briquettes as determined using TGA under nitrogen between 20-1200° C.

From the DSC characterisation of the blended briquettes carried out in Work Package 1, the expected endpoint of the reduction process (under DSC conditions) was approximately 950° C. At this temperature, the TGA had a residual sample mass of 57%. By plotting the residual mass for microwave treated samples against microwave energy input in FIG. 9, and fitting a treatment curve for 1 kW and 2 kW applied power, it was possible to determine a predicted metallisation range, based on residual mass. This prediction assumed that all residual mass from the microwave treated samples had been recovered and that reduction conditions for DSC-TGA and microwave treatment were similar.

Based on this, four of the microwave treated samples (highlighted in the yellow region of FIG. 9) showed significant or complete metallization. The curves also suggested that a microwave energy dose of ~38 GJ/t of product in the un-optimised system used would be sufficient to achieve metallization based on a residual mass of 57%.

FIG. 10 plots the XRD spectra for the ten microwave treatments for which the full residual sample mass was recoverable, together with the XRD spectra for the untreated briquettes. Labels represent the major peaks for each of the iron minerals present in the samples (some minor peaks have not been identified by the mineral identification software)

The XRD results show a clear increase in the level of transformation from hematite to metallic iron with increasing microwave energy input/treatment time. Of the four samples identified in FIG. 10 as likely to have a high degree of metallization, three have significant peaks for metallic iron, namely 1 kW 12 minutes, 1 kW 16 minutes and 2 kW 8 minutes.

The spectra for intermediate treatment energies also reveal the presence of two other iron oxide reduction products, magnetite and wustite. The presence of these intermediates suggests the following metallization pathway under anoxic conditions:

$$Fe_2O_3 \rightarrow Fe_3O_4 \rightarrow FeO \rightarrow Fe$$

Hematite→magnetite→wurstite→iron

The XRD spectra for the samples with a high degree of metallization also revealed a side reaction, which occurs between quartz and magnetite at high temperatures, the production of fayalite (olivine) and additional oxygen:

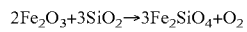

$$2Fe_2O_3 + 3SiO_2 \rightarrow 3Fe_2SiO_4 + O_2$$

From the tests conducted in this feasibility study, it was not possible to determine whether the production of intermediates and side products was driven by energy input/treatment time or by the levels of oxygen present during microwave treatment.

Due to the amorphous content of the samples resulting from the high biomass content, it was not possible to provide quantitative results with respect to the amount of iron and iron oxides present in each of the samples. Given that the reduction reaction proceeds from hematite through to iron, it was possible to estimate the degree of metallization. For each sample, the areas under the principal iron peak (44.2<2θ<45.0) and the principal hematite peak (32.3<2θ<33.7) were determined. FIG. 11 plots the ratio of these peaks as a function of microwave energy input.

At treatment energies below 12 GJ/t product (equivalent to approximately 2400 kWh/t blended briquettes) an increase in power density increased the degree of metallization. FIG. 11 shows higher mass loss at equivalent energy inputs at 2 kW compared to 1 kW applied power. This can be attributed to faster heating rates, which are more significant at shorter treatment times. This effect was validated by the XRD spectra in FIG. 10, which shows the presence of goethite in the 1 kW 4 minutes sample, but not in the 2 kW 4 minutes sample, suggesting that the goethite dihydroxylation temperature (between 300 and 400° C.) had not been exceeded at the lower power, even though treatment energies are the same.

2.4 Additional Sugar Treatment Results

An additional treatment was undertaken, replacing the biomass with white granulated table sugar, i.e. sucrose, $C_{12}H_{22}O_{11}$.

12 grams of sucrose was mixed with 18 grams of PBF, together with 5 ml of water, forming a thick paste. The sample was treated using the same method as the briquettes, at 2 kW for 8 minutes.

FIG. 12 shows the XRD spectra for the PBF-sugar blend compared to the PBF/*Azolla* blend and the unprocessed ore fines. The sugar sample exhibited lower levels of metallization compared to the *Azolla* at equivalent microwave energy input. The XRD also shows that higher proportions of the intermediate iron oxides, magnetite and wustite, were formed when using sugar. This is not thought to be due to loss of sugar into the firebrick as high temperature putty was used to reduce the permeability of the treatment enclosure.

A key observation here is that varying the type of biomass used in the direct reduction process provides an opportunity to control the proportion of intermediate oxides formed.

Two additional treatments using sugar were also carried out, at 50% and 70% sugar content by mass.

FIG. 13 shows the XRD spectra for the three sugar treatments compared to unprocessed ore fines. The higher sugar content samples exhibited a higher degree of metallization with lower levels of intermediate iron oxides remaining. This suggests that a higher proportion of reducing gases present leads to better metallization.

2.5 Energy Balance

Estimates of sensible microwave energy input showed that metallization of iron ore blended with biomass could be achieved at significantly lower microwave energy inputs than those totals quoted and potentially of the same order as the sensible DRI energy used in the best performing commercial DRI processes (~2 GJ/tonne for gas based system), even at laboratory scale in a non-optimised system.

More particularly, an energy balance with a basic estimate of heat losses during microwave processing indicated that direct reduction of iron ore using microwave heating at small batch scale was achieved at energy inputs of 1.6 GJ/t product. Without estimation of heat losses this is equivalent to around 32 GJ/t of blended briquette feed, or 74 GJ/t product.

It should be possible to reduce this value significantly in an optimised industrial system where heat losses are minimised.

Experience of scale up indicates that significantly higher energy inputs, often of several orders of magnitude greater, are required in small un-optimised batch lab scale systems compared to in the continuous operation of a well-designed optimised industrial process.

2.6 Work Package 2 Summary

Laboratory scale microwave treatments at 2450 MHz using a non-optimised system and subsequent semi-quantitative XRD analysis, demonstrated that high levels of metallization could be achieved using microwave energy. Analysis of XRD characterisation of briquettes of 35% and 40% biomass content (by mass) processed using a conventional furnace suggests that optimising the biomass type and amount could enhance the reduction process by controlling the reducing atmosphere and associated reactions of iron within that atmosphere.

This trend was also observed in the XRD spectra for PBF blended with 35%, 50% and 70% sugar content, with higher sugar loadings resulting in more complete metallization and reduced proportions of intermediate iron oxides at equivalent bulk microwave energy inputs.

3. Conclusions form Work Packages 1 and 2

The feasibility study showed that it is possible to achieve metallization of iron ore blended with biomass, using microwave energy as the heat source. The dielectric properties measured show that the PBF (iron ore fines) *Azolla* biomass and blended briquettes all interacted strongly with microwave energy at the industrially utilised frequencies of 2450 MHz and 915 MHz. The derived microwave penetration depth of 5 cm at 915 MHz above 500° C. verified that from a microwave heating perspective it would be possible to achieve volumetric heating of a continuous load of 5-10 cm thick (although some heating did occur beyond the defined penetration depth). There was no clear effect of power density (between 1 kW and 2 kW) on the degree of metallisation, at temperatures above 500° C. and 30 GJ/t product microwave energy input. However the ability to provide bulk heating to the material provides the opportunity to overcome heat transfer limitations. This could lead to faster heating rates and shorter residence times, with the resulting lower plant size, direct use of sinter fines, reduced CAPEX and greater process control as possible advantages. The variable production of intermediate iron oxides, (magnetite and wustite) and side reaction products (fayalite) for different biomass loadings indicated that there is an opportunity to optimise the reduction and metallization process by altering biomass content and controlling the reductive atmosphere, leading to metallization at lower microwave energy inputs. Finally, the energy balance estimated heat losses in feasibility testing in the non-optimised system of almost 90%. Metallization at MW energy inputs of ~2 GJ/t product could therefore be achievable in an optimised industrial process with heat losses minimised.

FIG. 14—Block Diagram of an Embodiment

With reference to the block diagram of FIG. 14, in one embodiment of the invention, briquettes of a blend of a selected ratio of iron ore fines and biomass are supplied as a feed material to a pre-heating furnace 3 and pre-heated to a temperature in the range of 400-600° C. for a pre-determined time.

The pre-heating furnace 3 is designed to operate on a batch basis.

The pre-heated briquettes are then transferred to a reduction assembly 5 and the iron ore fines are heated and reduced in the assembly 5.

The assembly 5 is also designed to operate on a batch basis.

The assembly 5 includes a chamber for the briquettes, a source of microwave energy, a wave guide for transferring electromagnetic energy in the form of microwave energy at 2450 MHz or other suitable frequency to the chamber, a source of inert gas, such as nitrogen, suitable pipework for supplying the inert gas to the chamber to maintain the chamber under anoxic conditions during the treatment of the briquettes in the chamber, and an outlet for discharging gas and any retained particulates that are generated during the treatment in the chamber.

In use, while the chamber is maintained under anoxic conditions, microwave energy heats the iron ore fines and biomass and generates heat within both constituents of the briquettes, with the result of reduction of the iron ore fines in a solid state via the biomass within the briquettes to form a solid state metallised product.

The process includes a control system for controlling the operating conditions so that iron ore is heated to a selected temperature for a selected residence time at temperature. In the case of hematite, the process includes controlling the operating conditions so that the hematite is heated to a temperature in a range of 800-1100° C. to metallise the hematite.

The solid state metallised product can be stored and transported to other plants to be processed as required to produce end-use steel or other products.

Whilst the embodiment described in relation to FIG. 14 is described as a batch process, it can readily be appreciated that the invention is not so limited and could be operated as a continuous process in both pre-heating and reduction steps.

In addition, whilst the embodiment described in relation to FIG. 14 is described as operating with microwave energy, it can readily be appreciated that the invention is not so limited and could be operated with any suitable electromagnetic energy.

I claim:

1. An apparatus for direct reduction of iron ore in a solid state with biomass as a reductant, the apparatus including:
    a pre-heating furnace for pre-heating briquettes of iron ore fragments and biomass with the biomass being 20-45% of the total mass of the briquettes to a temperature in the range of 400-900° C.; and
    a reduction assembly for receiving pre-heated briquettes from the pre-heating furnace, the reduction assembly including:
        a reaction chamber for reducing iron ore under anoxic conditions,
        a source of microwave energy,
        a wave guide for transferring microwave energy to the chamber for heating and reducing iron ore in briquettes from the pre-heating furnace, with biomass acting as a reductant,
        a source of an inert gas,
        pipework for supplying the inert gas to the chamber to maintain the chamber under anoxic conditions, and
        an outlet for discharging an offgas and any entrained particulates that are generated in the chamber.

2. The apparatus defined in claim 1 wherein the source of the inert gas is a source of nitrogen.

3. The apparatus defined in claim 1 further including a power plant for combusting the offgas from the reaction chamber to provide electricity.

4. The apparatus defined in claim 1 wherein the pre-heating furnace is designed to operate on a batch basis.

5. The apparatus defined in claim 4 wherein the reduction assembly is designed to operate on a batch basis.

* * * * *